United States Patent Office 2,908,700
Patented Oct. 13, 1959

2,908,700

PROCESS FOR PRODUCING CYANOALKYL-SILANES WITH A HINDERED PHENOL CATALYST

Victor B. Jex and John E. McMahon, Buffalo, N.Y., assignors to Union Carbide Corporation, a corporation of New York No Drawing. Application December 23, 1955
Serial No. 555,208

15 Claims. (Cl. 260—448.2)

This invention relates to a process for producing cyanoalkylsilanes. More particularly, the invention relates to a process for producing cyanoalkylsilanes containing at least one hydrolyzable group bonded to the silicon atom thereof.

By reacting an olefinic nitrile of the type represented by acrylonitrile, methacrylonitrile, crotononitrile and the like with a silane containing at least one hydrogen atom and at least one hydrolyzable group bonded to the silicon atom thereof there is produced a reaction product from which an alpha-cyanoalkylsilane can be recovered. The overall reaction which takes place can be graphically represented by the following equation, which depicts, for the purpose of illustration, the reaction between acrylonitrile and trichlorosilane.

$$H_2C=CH-CN + HSiCl_3 \longrightarrow \underset{\underset{SiCl_3}{|}}{\overset{\overset{H}{|}}{H_2C-CH-CN}}$$

The present invention is based on our discovery that an olefinic nitrile or alkene nitrile of the type represented by acrylonitrile, methacrylonitrile, crotononitrile and the like can be caused to react with a silane containing at least one hydrogen atom and at least one hydrolyzable group bonded to the silicon atom thereof, in the presence of a catalyst to produce a beta-cyanoalkylsilane formed by the addition of a silyl group to the beta carbon atom of such nitrile, that is the olefinic carbon atom further removed from the cyano group of the nitrile, and by the addition of a hydrogen atom to the alpha carbon atom of such nitrile, that is the vicinal olefinic carbon atom. Based on our discovery we have further found that any olefinic nitrile can be caused to react with a silane, containing at least one hydrogen atom and at least one hydrolyzable group bonded to the silicon atom thereof, in the presence of a catalyst to produce a cyanoalkylsilane by the addition of a silyl group to the olefinic carbon atom further removed (*) from the cyano group of the nitrile

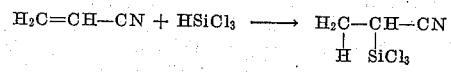

and by the addition of a hydrogen atom to the olefinic carbon atom closer to the cyano group of the nitrile. The overall reaction which takes place can be graphically represented by the following equations which depict for the purpose of illustration the reaction between acrylonitrile and trichlorosilane and the reaction between allyl cyanide and triethoxysilane:

$$H_2C=CH-CN + HSiCl_3 \xrightarrow{\text{catalyst}} \underset{\underset{Cl_3Si}{|}}{\overset{\overset{H_2C-CH-CN}{|}}{\phantom{X}}} \quad (1)$$

$$H_2C=CH-CH_2-CN + HSi(OEt)_3 \xrightarrow{\text{catalyst}}$$
$$\underset{\underset{(EtO)_3Si}{|}}{\overset{\overset{H_2C-CH-CH_2-CN}{|}}{\phantom{X}}} \quad (2)$$

Our process can be carried out by forming a mixture of an olefinic nitrile, a silane containing at least one hydrogen atom and at least one hydrolyzable group bonded to the silicon atom thereof and a small or catalytic amount of a hindered phenol as catalyst for the reaction and heating the mixture to a temperature sufficiently elevated to cause the starting materials to react. There results or is produced a cyanoalkylsilane by the addition of a silyl group to the olefinic carbon atom of the nitrile further removed from the cyano group and by the addition of a hydrogen atom to the olefinic carbon of the nitrile closer to the cyano group.

The silane starting materials, containing at least one hydrogen atom and at least one hydrolyzable group bonded to the silicon atom thereof, which we can employ in the process can be graphically represented by the following general formula:

$$H-\underset{\underset{}{|}}{\overset{\overset{R'''_{(n)}}{|}}{Si}}-X_{(3-n)}$$

wherein R''' represents a hydrogen atom or a hydrocarbyl group, preferably a saturated aliphatic hydrocarbyl group as for example, an alkyl group, such as methyl, ethyl, propyl, butyl, pentyl and the like; a cycloalkyl group such as cyclopentyl, cyclohexyl, methylcyclopentyl, ethylcyclohexyl, and the like; or an aryl group such as naphthyl, tolyl, methylnaphthyl and the like, X is a hydrolyzable group such as a halogen atom, preferably a chlorine atom; or a hydrocarbyloxy group, preferably an alkoxy or an aryloxy group such as methoxy, ethoxy, propoxy, phenoxy and the like, and $n$ is a whole number having a value of from 0 to 2. Illustrative of the silane starting materials are trichlorosilane, triethoxysilane, dichlorosilane, diethoxysilane, monochlorosilane, monoethoxysilane, methyldichlorosilane, ethyldiethoxysilane, diethylethoxysilane, dimethylchlorosilane, butylethylchlorosilane, phenyldichlorosilane, phenylethylethoxysilane, dipropylphenoxysilane and the like.

The olefinic nitrile starting materials we can employ are the acyclic aliphatic mono-olefinic nitriles which contain from three to ten carbon atoms to the molecule. Illustrative of such olefinic nitriles or alkene nitriles are acrylonitrile, methacrylonitrile, allyl cyanide, 1-cyano-3-butene, 1-cyano-4-pentene, 1-cyano-1-hexene and the like. Our preferred olefinic nitrile starting materials are those compounds in which the unsaturated grouping $$(-\overset{|}{C}=\overset{|}{C}-)$$

is directly bonded through one of the carbon atoms thereof to the carbon atom of the cyano group. Such olefinic nitriles are commonly known as the vinyl-type cyanides and can be represented graphically by the general formula:

$$R-CH=\underset{\underset{}{|}}{\overset{\overset{A}{|}}{C}}-CN$$

where R can be a hydrogen atom or an alkyl group as for example methyl, ethyl, propyl, butyl and the like and A is either a hydrogen atom or a methyl group. Illustrative of such vinyl-type cyanides are acrylonitrile, methacrylonitrile, crotononitrile, and the like.

The hindered phenol compounds which we employ as catalyst in our process direct the addition of the silyl group of our starting silane to the olefinic carbon atom of our starting nitrile further removed from the cyano group thereof and the addition of the hydrogen atom of the starting silane to the vicinal olefinic carbon atom. They are those tri-substituted phenols which contain two large alkyl groups substituted in the ortho position with respect to the hydroxy group and which contain an alkyl group, a cyclohexyl group, an aryl group or another hindered phenol group substituted in the para position with respect to the hydroxy group. Illustrative of such hindered phenols are: 2,4,6-tri-tert-butylphenol, 2,6-di-tert-butyl-4-methylphenol, 2,4-di-tert-butyl-6-phenylphenol, 2,4-di-tert-butyl-6-cyclohexylphenol, 2,4,6-tri-tertamylphenol, 2,4-di-tert-amyl-6-tert-butyl-phenol, 2,4-di-tert-amyl-6-cyclohexylphenol, 2,6-di-tert-amyl-4-methyl-phenol, 2,6-di-tert-amyl-4-tert-butylphenol, 2-tert-butyl-4-methyl-6-tert-amylphenol, 2,2'-methylene-bis(4-methyl-6-tert-butylphenol) and the like.

We have found that the amount of the catalyst employed in our process is not narrowly critical. Thus, amounts of the hindered phenols of from as little as about 0.2 part to as much as about 10 parts by weight per 100 parts of the total weight of the starting materials can be favorably employed. We preferably employ the catalyst in an amount of from about 0.3 part to about 3 parts by weight per 100 parts of the total weight of the nitrile and silane starting materials. Amounts of the hindered phenols in smaller or greater quantities than the favorable range can also be employed. However, no commensurate advantage is obtained thereby.

The olefinic nitrile and silane starting materials can be employed in our process in amounts which can vary from about one-half to two moles of the nitrile per mole of the silane. Preferably, the reactants are employed in equimolar amounts. Amounts of either of the starting materials in excess of the ratios set forth above can also be employed; however, no commensurate advantage is obtained thereby.

To facilitate observation and at the same time to favor closer control of the reaction conditions, most of our experimental work was carried out in pressure vessels or bombs, with agitation being provided if desired by continuous shaking. Similar results can be obtained with flowing reactants in apparatus of known design permitting the maintenance of a closed system. In the reactions with which our invention is concerned, it is desirable to maintain sufficiently high concentrations of the reactants (as measured for example in moles per liter of reaction space) to promote effective contact between the molecules to be reacted. When one of the reactants is a gas, or a liquid readily volatile at the reaction temperature, and the reaction mixture is permitted to expand freely on heating, the concentration of that reactant will fall to a low value thus considerably slowing the reaction rate. If, however, the reactants are charged to a closed vessel which is sealed before heating, the initial concentration of any reactant falls off through its consumption by the reaction. If a reactant is a gas, it may be desirable to charge the reaction vessel to a considerable pressure to secure an adequate concentration and reaction rate, and also to supply enough of the reactant to produce an acceptable quantity of the product.

The temperatures which can be employed in carrying out our process are not narrowly critical and can vary over a wide range. For example, temperatures as low as 40° C. and as high as 350° C. can be advantageously employed. When conducting the process of the invention in a closed vessel a temperature in the range from about 125° C. to about 250° C. is preferred. Under such conditions, a reaction period of from about two to about five hours is suitable. Temperatures of from about 175° C. to about 300° C. are preferred when conducting the process in apparatus which provides for the flow of the reactants and products while maintaining the conditions of a closed system. In such systems, where the pressure may range from atmospheric up to 4000 pounds per square inch and higher, the time required for the reaction to take place can be as short as 0.005 minute.

In carrying out the process of our invention the product initially obtained comprises a mixture of compounds including the main cyanoalkylsilane reaction product as well as some unreacted nitrile and unreacted silane starting compounds. The desired addition product, formed by the addition of a silyl group to the olefinic carbon atom of the nitrile further removed from the cyano group and by the addition of a hydrogen atom to the olefinic carbon atom closer to the cyano group, which contains at least one hydrolyzable group bonded to the silicon atom thereof, as for example beta-cyanoethyltrichlorosilane, can be recovered from the initially obtained reaction product by a distillation procedure which is preferably conducted under reduced pressure.

The mechanism of our overall reaction whereby products are produced by the addition of a silyl group to the olefinic carbon atom of the starting nitrile further removed from the cyano group and by the addition of a hydrogen atom to the olefinic carbon atom of the starting nitrile closer to the cyano group with the apparent suppression of other addition or reaction products is not known with certainty or fully understood. It is known that upon heating our reactants in the absence of a hindered phenol as catalyst other reactions take place such as: the formation of both silicon- and non-silicon-containing free radicals and complexes, the homopolymerization of the starting nitrile, and even the disproportionation of the starting silane has been observed. In addition, it is known that in the absence of a hindered phenol as catalyst, our preferred starting materials can react to produce a product from which an alpha-cyanoalkylsilane, formed by the addition of a silyl group to the olefinic carbon closer to the cyano group and by the addition of a hydrogen atom to the vicinal olefinic carbon, can be recovered with no beta-addition products being formed. One possible explanation for the course which our reaction follows when a silane and an olefinic nitrile react in the instance where the nitrile is a vinyl-type cyanide is that the addition of the silyl group to the olefinic carbon atom more removed from the cyano group of the nitrile occurs through an ionic mechanism while the addition of such silyl group to the olefinic carbon atom closer to the cyano group of the nitrile occurs through a free radical mechanism. If such is the case, then the activation energy required for the reaction, between our starting nitriles and silanes, to proceed by a free radical mechanism is considerably less than that required to cause the reaction to proceed by an ionic mechanism and consequently the reaction between an olefinic nitrile and a silane, as for example acrylonitrile and trichlorosilane will produce the alpha-addition product namely, alpha-cyanoethyltrichlorosilane. On the other hand, our hindered phenol catalysts apparently have the effect of markedly decreasing the activation energy required for the reaction to proceed by an ionic mechanism and therefore when employed in such reactions, as for example in the above acrylonitrile-trichlorosilane reaction, result in the production of beta-cyanoethyltrichlorosilane.

When the olefinic nitrile is of the type represented by allyl cyanide, that is where the unsaturated grouping

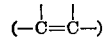

is removed by one or more carbon atoms from the cyano group, our catalyst also functions in promoting the reaction thereof with our silane starting materials to produce addition products by the addition of a silyl group to the olefinic carbon atom more removed from the cyano group, and by the addition of a hydrogen atom to the olefinic carbon closer to the cyano group. By way of illustration, gamma-cyanopropyltrichlorosilane is prepared by reacting allyl cyanide with trichlorosilane in the presence of a hindered phenol catalyst in accordance with the subject process.

Bis(cyanoalkyl)silanes are produced in the practice of the process of our invention when our starting nitriles are reacted with silanes containing at least two hydrogen atoms bonded to the silicon atom thereof. In such instances the nitrile starting material is preferably employed in an amount of at least twice the number of moles of the starting silane. The products of the reaction include, in addition to the desired bis compound, the cyanoalkyl-hydrogensilane. By way of illustration, when two moles of acrylonitrile are reacted with one mole of dichlorosilane in the presence of a hindered phenol there is obtained, bis(beta-cyanoethyl)dichlorosilane and beta-cyanoethylhydrogendichlorosilane. Following such procedures, the tris compounds can also be obtained if a silane containing at least three hydrogen atoms bonded to the silicon atom thereof is employed as the starting material.

Cyanoalkylsilanes, especially the cyanoalkylsilanes in which the silyl group is bonded to the carbon atom of the nitrile further removed from the cyano group thereof, have found particular use as starting materials in the preparation of omega-aminoalkylsilane sizes for fibrous glass materials.

The following examples are illustrative of the present invention.

Example 1

To a 50 cc. steel pressure vessel were added 0.15 moles (7.9 g.) of acrylonitrile, 0.15 mole (20.3 g.) of trichlorosilane and 0.56 g. (2 percent by weight) of di-tert-butyl para cresol. The vessel was sealed and heated to a temperature of 200° C. for a period of two hours. After heating, the vessel was cooled to room temperature and the product removed therefrom and placed in a flask connected to a distillation column. The contents of the flask were heated to its boiling temperature under reduced pressure and there was obtained 5.93 g. of essentially beta-cyanoethyltrichlorosilane boiling at a temperature of 75° to 80° C. under a reduced pressure of 3 mm. Hg. The 5.93 g. of beta-cyanoethyltrichlorosilane represented a yield of 21 percent based on the total number of moles of the starting materials.

Example 2

To a steel pressure vessel were added equal molar amounts of acrylonitrile and trichlorosilane together with about 2 percent by weight of the acrylonitrile and trichlorosilane of 2,2'-methylene-bis(4-methyl-6-tert-butylphenyl). The vessel was sealed and heated to a temperature of about 250° C. for a period of two hours. After heating, the vessel was cooled to room temperature and the product removed therefrom and placed in a flask connected to a distillation column. The contents of the flask were heated to its boiling temperature under reduced pressure. A yield of 13.4 mole percent of beta-cyanoethyltrichlorosilane, based on the total number of moles of the starting material, was obtained.

What is claimed is:

1. A process for reacting a silane, represented by the formula:

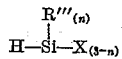

where R''' represents a member of the group consisting of hydrogen and a hydrocarbyl group, X represents a hydrolyzable group from the class consisting of halogen and hydrocarbyloxy groups and n represents a whole number having a value of from 0 to 2, with an alkene nitrile having from 3 to 10 carbon atoms to produce a cyanoalkylsilane by the addition of a silyl group to the olefinic carbon atom of said nitrile further removed from the cyano group thereof and by the addition of a hydrogen atom to the olefinic carbon atom of said nitrile closer to the cyano group thereof which comprises forming a mixture of said silane, said nitrile, and a hindered phenol catalyst, heating said mixture to a temperature of at least 40° C. to cause said silane and nitrile to react to produce a cyanoalkylsilane by the addition of a silyl group to the olefinic carbon atom further removed from the cyano group of the starting nitrile and by the addition of a hydrogen atom to the olefinic carbon atom closer to the cyano group of the starting nitrile.

2. A process for reacting a silane, represented by the formula:

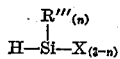

where R''' represents a member of the group consisting of hydrogen and a hydrocarbyl group, X represents a hydrolyzable group from the class consisting of halogen and hydrocarbyloxy groups and n represents a whole number having a value of from 0 to 2, with an alkene nitrile having from 3 to 10 carbon atoms containing the unsaturated grouping

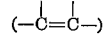

to produce a cyanoalkylsilane by the addition of a silyl group to the carbon atom of said unsaturated grouping further removed from the cyano group of said nitrile and by the addition of a hydrogen atom to the carbon atom of said unsaturated grouping closer to the cyano group of said nitrile which comprises forming a mixture of said silane, said nitrile, and a hindered phenol catalyst, heating said mixture to a temperature of from about 40° C. to about 350° C. to cause said silane and nitrile to react to produce a cyanoalkylsilane by the addition of a silyl group to the carbon atom of the unsaturated grouping further removed from the cyano group of the starting nitrile and by the addition of a hydrogen atom to the carbon atom of the unsaturated grouping closer to the cyano group of the starting nitrile and recovering the cyanoalkylsilane.

3. A process for reacting a silane, represented by the formula:

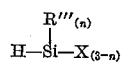

where R''' represents a member of the group consisting of hydrogen and a hydrocarbyl group, X represents a hydrolyzable group taken from the class consisting of halogen and hydrocarbyloxy groups and n represents a whole number having a value of from 0 to 2, with a nitrile having from 3 to 10 carbon atoms and the formula:

where R is a member of the group consisting of hydrogen and an alkyl group and A is a member of the group consisting of a hydrogen atom and a methyl group to produce a cyanoalkylsilane by the addition of a silyl group to the olefinic carbon atom of the nitrile further removed from the cyano group thereof and by the addition of a hydrogen atom to the olefinic carbon atom of the nitrile closer to the cyano group thereof which comprises forming a mixture of said silane, said nitrile, and a hindered phenol catalyst, heating said mixture to a temperature of from about 40° C. to about 350° C. to cause said silane and nitrile to react to produce a cyanoalkylsilane by the addition of a silyl group to the olefinic carbon atom further removed from the cyano group of the starting nitrile and by the addition of a hydrogen atom to the olefinic carbon atom closer to the cyano group of the starting nitrile and recovering the cyanoalkylsilane.

4. A process for producing a beta-cyanoethylsilane which comprises forming a mixture comprising a silane of the formula:

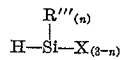

where R''' represents a member of the group consisting of hydrogen and a hydrocarbyl group, X represents a hydrolyzable group taken from the class consisting of halogen and hydrocarbyloxy groups and n represents a whole number having a value of from 0 to 2, acrylonitrile and a hindered phenol catalyst, heating said mixture to a temperature sufficiently elevated to cause said silane and acrylonitrile to react to produce a beta-cyanoethylsilane.

5. A process for producing a beta-cyanoethylsilane which comprises forming a mixture comprising a silane of the formula:

$$H-\underset{\underset{X_{(3-n)}}{|}}{Si}-R'''_{(n)}$$

where R''' represents a member of the group consisting of hydrogen and a hydrocarbyl group, X represents a hydrolyzable group taken from the class consisting of halogen and hydrocarbyloxy groups and $n$ represents a whole number having a value of from 0 to 2, acrylonitrile and a hindered phenol catalyst, heating said mixture to a temperature of from about 125° C. to about 300° C. to cause said silane and acrylonitrile to react to produce a beta-cyanoethylsilane and recovering said beta-cyanoethylsilane.

6. A process for producing a gamma-cyanopropylsilane which comprises forming a mixture comprising a silane of the formula:

$$H-\underset{\underset{X_{(3-n)}}{|}}{Si}-R'''$$

where R''' represents a member of the group consisting of hydrogen and a hydrocarbyl group, X represents a hydrolyzable group taken from the class consisting of halogen and hydrocarbyloxy groups and $n$ represents a whole number having a value of from 0 to 2, allyl cyanide and a hindered phenol catalyst, heating said mixture to a temperature of from about 125° C. to about 300° C. to cause said silane and allyl cyanide to react to produce a gamma-cyanopropylsilane.

7. A process for producing beta-cyanoethyltrichlorosilane which comprises forming a mixture of acrylonitrile, trichlorosilane and a hindered phenol, heating said mixture to a temperature of from about 125° C. to about 300° C. to cause said acrylonitrile and trichlorosilane to react to produce beta-cyanoethyltrichlorosilane.

8. A process for producing beta-cyanoethyltriethoxysilane which comprises forming a mixture comprising acrylonitrile, triethoxysilane and a hindered phenol, heating said mixture to a temperature of from about 125° C. to about 300° C. to cause said acrylonitrile and triethoxysilane to react to produce beta-cyanoethyltriethoxysilane.

9. A process for producing beta-cyanoethyltrichlorosilane which comprises forming a mixture comprising acrylonitrile, trichlorosilane and 2,6-di-tert-butyl-4-methylphenol, heating said mixture to a temperature of from about 125° C. to about 300° C. to cause said acrylonitrile and trichlorosilane to react to produce beta-cyanoethyltrichlorosilane.

10. A process for producing beta-cyanoethyltriethoxysilane which comprises forming a mixture comprising acrylonitrile, triethoxysilane and 2,2'-methylene-bis(4-methyl-6-tert-butylphenol), heating said mixture to a temperature of from about 125° C. to about 300° C. to cause said acrylonitrile and triethoxysilane to react to produce beta-cyanoethyltriethoxysilane.

11. A process for producing gamma-cyanopropyltrichlorosilane which comprises forming a mixture of allyl cyanide, trichlorosilane and di-tert-butyl para cresol, heating said mixture to a temperature of from about 125° C. to about 300° C. to cause said allyl cyanide and trichlorosilane to react to produce gamma-cyanopropyltrichlorosilane.

12. A process for producing a beta-cyanoethylalkyldichlorosilane which comprises forming a mixture of acrylonitrile, alkyldichlorosilane and a hindered phenol, heating said mixture to a temperature of from about 125° C. to about 300° C. to cause said acrylonitrile and alkyldichlorosilane to react to produce a beta-cyanoethylalkyldichlorosilane.

13. A process for producing a beta-cyanoethylaryldichlorosilane which comprises forming a mixture of acrylonitrile, aryldichlorosilane and a hindred phenol, heating said mixture to a temperature of from about 125° C. to about 300° C. to cause said silane and acrylonitrile to react to produce a beta-cyanoethylaryldichlorosilane.

14. A process for producing beta-cyanoethyltrichlorosilane which comprises forming a mixture comprising acrylonitrile, trichlorosilane and 2,2'-methylene-bis(4-methyl-6-tert-butylphenol), heating said mixture to a temperature of from about 125° C. to about 300° C. to cause said acrylonitrile and trichlorosilane to react to produce beta-cyanoethyltrichlorosilane.

15. A process for reacting a silane, represented by the formula:

$$H-\underset{\underset{X_{(3-n)}}{|}}{Si}-R'''_{(n)}$$

where R''' represents a member of the group consisting of hydrogen and a hydrocarbyl group, X represents a hydrolyzable group from the class consisting of halogen and hydrocarbyloxy groups and $n$ represents a whole number having a value of from 0 to 2, with an alkene nitrile having from 3 to 10 carbon atoms to produce a cyanoalkylsilane by the addition of a silyl group to the olefinic carbon atom of said nitrile further removed from the cyano group thereof and by the addition of a hydrogen atom to the olefinic carbon atom of said nitrile closer to the cyano group thereof which comprises forming a mixture of said silane, said nitrile, and a hindered phenol catalyst within a closed system, heating said mixture to a temperature sufficiently elevated to cause said silane and nitrile to react to produce a cyanoalkylsilane by the addition of a silyl group to the olefinic carbon atom further removed from the cyano group of the starting nitrile and by the addition of a hydrogen atom to the olefinic carbon atom closer to the cyano group of the starting nitrile.

References Cited in the file of this patent

UNITED STATES PATENTS

| | | |
|---|---|---|
| 2,481,080 | Castner et al. | Sept. 6, 1949 |
| 2,716,638 | Cohen et al. | Aug. 30, 1955 |
| 2,721,873 | MacKenzie et al. | Oct. 25, 1955 |
| 2,728,785 | Albisetti et al. | Dec. 27, 1955 |

FOREIGN PATENTS

| | | |
|---|---|---|
| 961,878 | France | Nov. 8, 1949 |